US008239863B2

(12) United States Patent
Bhat et al.

(10) Patent No.: US 8,239,863 B2
(45) Date of Patent: Aug. 7, 2012

(54) METHOD AND SYSTEM FOR MIGRATING A VIRTUAL MACHINE

(75) Inventors: Santhosh R. Bhat, Karnataka (IN); Shailesh Dixit, Karnataka (IN); Matthias Popp, Roseville, CA (US); Rajesh Anantha Krishnaiyer, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 256 days.

(21) Appl. No.: 12/826,195

(22) Filed: Jun. 29, 2010

(65) Prior Publication Data

US 2011/0321041 A1    Dec. 29, 2011

(51) Int. Cl.
*G06F 9/455* (2006.01)
(52) U.S. Cl. ................................. 718/1; 711/6
(58) Field of Classification Search ........... 718/1; 711/6
See application file for complete search history.

(56) References Cited

U.S. PATENT DOCUMENTS

| 7,149,919 | B2  | 12/2006 | Cochran |
| 7,383,405 | B2  | 6/2008  | Vega |
| 7,484,208 | B1* | 1/2009  | Nelson .............................. 718/1 |
| 7,607,129 | B2  | 10/2009 | Rosu |
| 7,680,919 | B2* | 3/2010  | Nelson .......................... 709/223 |
| 7,904,692 | B2* | 3/2011  | Mukherjee et al. ............ 711/203 |
| 8,086,821 | B2* | 12/2011 | Mukherjee et al. ............ 711/203 |
| 2005/0060590 | A1* | 3/2005 | Bradley et al. ................. 713/320 |
| 2007/0180436 | A1 | 8/2007  | Travostino |
| 2008/0189700 | A1 | 8/2008  | Schmidt |
| 2008/0222375 | A1* | 9/2008 | Kotsovinos et al. .......... 711/162 |
| 2008/0263113 | A1 | 10/2008 | Krishnaiyer |
| 2009/0037680 | A1 | 2/2009  | Colbert |
| 2009/0055507 | A1 | 2/2009  | Oeda |
| 2009/0070760 | A1 | 3/2009  | Khatri |
| 2009/0089781 | A1* | 4/2009 | Shingai et al. .................... 718/1 |
| 2009/0249366 | A1 | 10/2009 | Sen |
| 2009/0276772 | A1* | 11/2009 | Garrett et al. ..................... 718/1 |
| 2011/0246669 | A1* | 10/2011 | Kanada et al. ................. 709/238 |

OTHER PUBLICATIONS

Nelson, Michael, et al., "Fast Transparent Migration for Virtual Machines," Proceedings of 2005 USENIX Annual Technical Conference, Anaheim, California, Apr. 10-15, 2005, pp. 391-394, (last accessed on Jun. 29, 2010).

VMWARE, Inc., "What is New for Storage in Virtual Infrastructure 3 Release 3.5," 2008, VMWare, Inc. 34011 Hillview Drive, Palo Alto, California, (last accessed on Jun. 29, 2010).

* cited by examiner

*Primary Examiner* — Andy Ho

(57) ABSTRACT

An exemplary embodiment of the present invention provides a method of migrating a virtual machine. The method comprises replicating a source storage device corresponding to the virtual machine to a target storage device through replication links. The method also comprises receiving a migration state that indicates initiation of a migration of the virtual machine from a source server to a target server. The method also comprises collecting storage system status information of the source storage device and storing the storage system status information to a persistent store accessible to the target server. The method also comprises sending memory states and central processing unit (CPU) states to the target server through a communications network. The method also comprises performing a failover of the virtual machine from the source server to the target server and from source storage device to target storage device.

20 Claims, 4 Drawing Sheets

METHOD AND SYSTEM FOR MIGRATING A VIRTUAL MACHINE

BACKGROUND

Several operating system instances also known as virtual machines can run on a single server through virtualization of the physical server architecture. These virtual machines may be referred to as "guest operating systems," and the servers they are run on may be referred to as "physical servers." These virtual machines can be moved or migrated across physical servers located in geographically dispersed data centers. However, the migration process often involves a certain amount of downtime for clients accessing a virtual machine during the migration process.

In some systems, storage resources used by the virtual machine can be made available in a shared fashion to all physical servers that represent a target of such migration. Such systems enable the virtual machine to be migrated from one physical server to another without significant downtime for the clients accessing the virtual machine during the migration process. However, storing the virtual machine's storage resources in a shared storage presents several limitations in situations where the physical servers are located in geographically dispersed data centers. For example, the shared storage resource represents a single point of failure in case of a catastrophic system failure or site disaster. Additionally, the shared storage can become a performance bottleneck due to network latency even if the workload is distributed among several physical servers. Further, scheduled maintenance on the shared storage system might require downtime of the physical servers and virtual machine infrastructure.

BRIEF DESCRIPTION OF THE DRAWINGS

Certain exemplary embodiments are described in the following detailed description and in reference to the drawings, in which.

DETAILED DESCRIPTION OF SPECIFIC EMBODIMENTS

Exemplary embodiments of the present invention provide invention for online migration of a virtual machine across physical servers and physical storage systems. As used herein, the term "exemplary" merely denotes an example that may be useful for clarification of the present invention. The examples are not intended to limit the scope, as other techniques may be used while remaining within the scope of the present claims.

In exemplary embodiments of the present invention, a virtual machine may be migrated between physical servers located in geographically dispersed data centers that use storage system based replication. As used herein, the term "source" refers to the initial location of the virtual machine from which the virtual machine is migrated, and the term "target" refers to the new location of the virtual machine to which the virtual machine is migrated. A virtual machine residing in a storage device of a source storage system and hosted in a source server may be migrated to a target server connected to a target storage system. The target server and target storage system may be geographically dispersed relative to the source server and source storage system. In some embodiments, the disk storage is continuously replicated between the two storage systems before, during, and after the virtual machine migration.

Time saving techniques may be implemented to speed the migration so that clients accessing the virtual machine will experience little or no downtime and no loss of connection. For example, the process of collecting storage device status information of the source storage system and sending the storage device status information to the target server may be conducted in parallel with the process of transferring the CPU states and system memory from the source server to the target server. Furthermore, in some exemplary embodiments, the migration of the virtual machine may be fully automated such that manual administrative functions can be eliminated.

Figure 1:
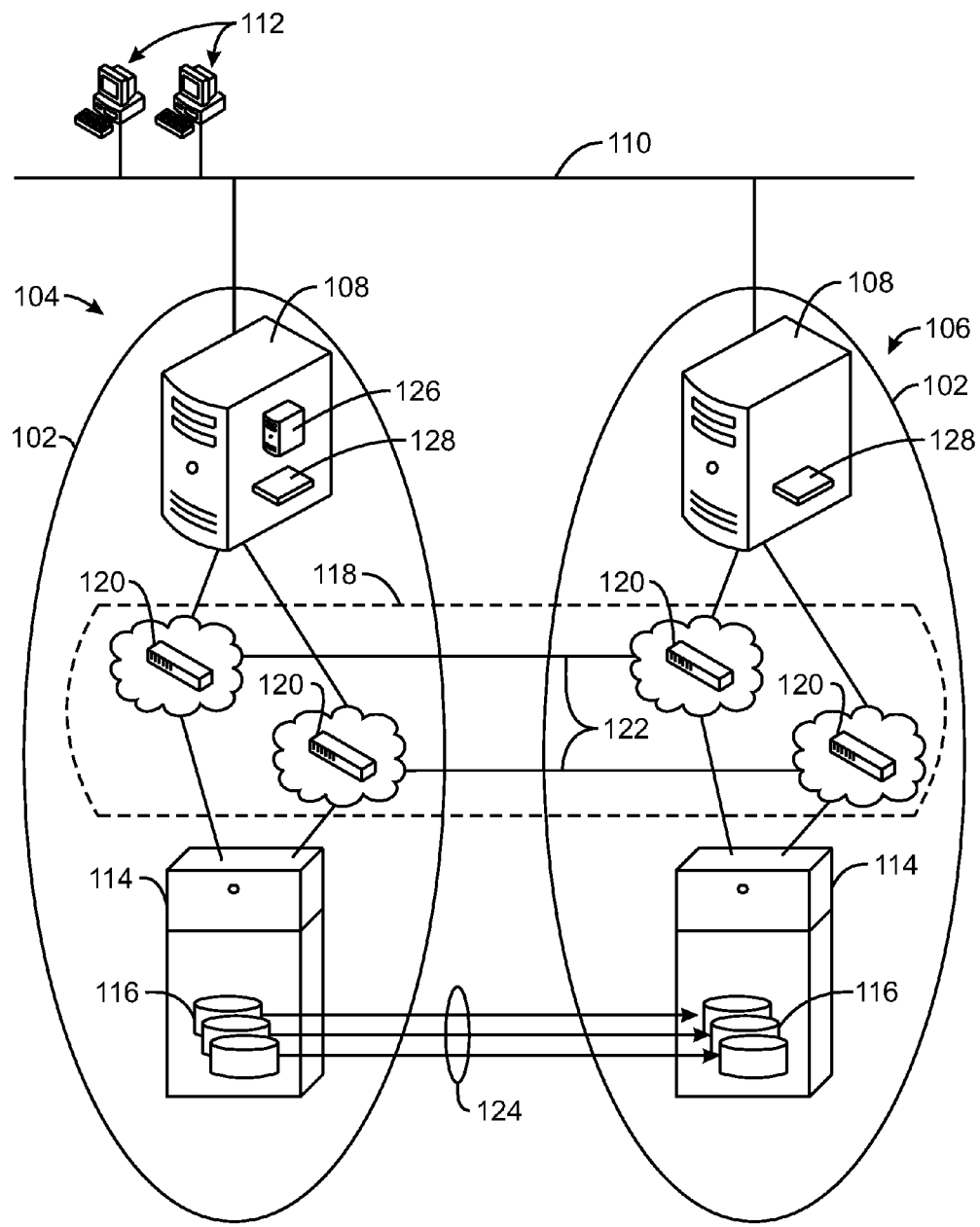
FIG. 1 is a diagram of a server network, in accordance with an exemplary embodiment of the present invention.

FIG. 1 is a diagram of a server network, in accordance with an exemplary embodiment of the present invention. The server network is generally referred to by the reference number 100. As shown in FIG. 1, the server network 100 may include data centers 102, which may be geographically dispersed, and are referred to herein as site A 104 and site B 106. Each data center 102 may include a number of servers 108 operatively coupled by a communications network 110, for example, a wide area network (WAN), local area network (LAN), virtual private network (VPN), the Internet, and the like. The communications network 110 may be a TCP/IP protocol network or any other appropriate protocol. Any number of clients 112 may access the servers 108 through the communications network 110. Each data center 102 may also include a data storage system 114 that includes storage devices 116, such as an array of physical storage disks. The servers 108 may access the data storage systems 114 through a storage area network 118, which may include a plurality switches 120 coupled by data links 122, for example, Ethernet interface connections, Fibre Channel links, SCSI (Small computer System Interface) interfaces, among others. The data storage systems 114 may be connected through replication links 124 for storage-based replication of the virtual machine data. In exemplary embodiments, the data links 122 and the replication links 124 are part of the storage area network 118. Data stored to the data storage systems 114 may be replicated between the data storage systems 114 of site A 104 and site B 106 through the replication links 124 using synchronous or asynchronous replication. Although physical connections are shown, the data links 122 and replication links 124 can also include virtual links routed through the communications network 110, for example, using Fibre Channel over Ethernet (FCoE) or Fibre Channel over IP (FCIP). The virtual links may be useful for geographically dispersed data centers.

Each server 108 may host one or more virtual machines 126, each of which provides an operating system instance to a client 112. The clients 112 can access the virtual machine 126 in a location transparent manner. The storage data associated with the virtual machine 126 may be stored to the corresponding data storage system 114 of the same data center 102. In other words, the virtual machine 126 running on the server 108 of site A 104 resides on the data storage system 114 of site A 104.

The servers 108 also include a migration manager 128 that controls the migration of the virtual machine 126, in accordance with embodiments of the present invention. The virtual machine may be migrated across geographically separated servers and storage systems. The migration managers 128 may migrate the virtual machine 126 from one physical server 108 to another and one data center 102 to another, for example, from site A 104 to site B 106. As described in relation to FIG. 2, different elements of the migration manager 128 take part in the virtual machine migration depending on whether the server 108 is the source server or the target server. The migration manager 128 may be implemented in hardware, software, or some combination thereof.

Those of ordinary skill in the art will appreciate that the configuration of the server network 100 is but one example of a network may be implemented in an exemplary embodiment of the present invention. Those of ordinary skill in the art would readily be able to modify the described server network 100 based on design considerations for a particular system. For example, a server network 100 in accordance with embodiments of the present invention may include any suitable number of data centers 102 and each data center 102 may include any suitable number of physical servers 108 and any suitable number of data storage systems 114. Further, each server 108 may include one or more virtual machines 126, each of which may be migrated to any other suitable server 108. For example, a virtual machine 126 hosted by the server 108 of site B 106 may be migrated to the server 108 of site A 104.

Figure 2:
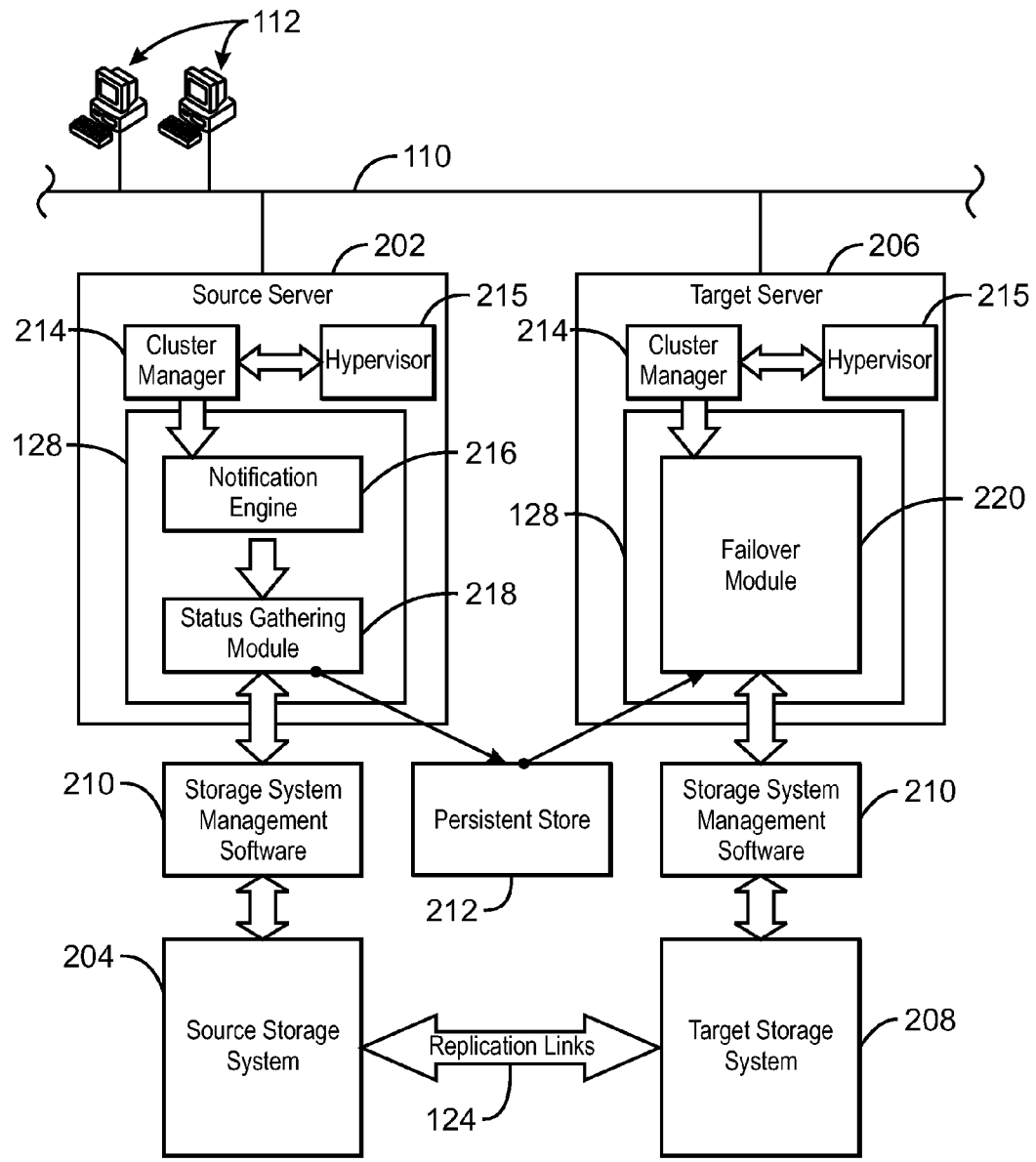
FIG. 2 is a block diagram of a virtual machine migration system, in accordance with an exemplary embodiment of the present invention.

FIG. 2 is a block diagram of a virtual machine migration system, in accordance with an exemplary embodiment of the present invention. The system is generally referred to by the reference number 200 and may be implemented in a network such as the server network 100 shown in FIG. 1. The system of FIG. 2 enables a virtual machine, such as virtual machine 126 of FIG. 1, hosted by a source server 202 and residing on a source storage system 204 to be migrated to a target server 206 and an associated target storage system 208. As described above, in relation to FIG. 1, the source server 202 and source storage system 204 may be included in a first data center 102, and the target server 206 and target storage system 208 may be included in a second, geographically separated data center 102. Further, the virtual machine related data stored to the source storage system 204 may be replicated to the target storage system through the replication links 124.

Each server 202 and 206 may include a central processing unit (CPU), which may be a multi-core processor, a multi-node processor, or a cluster of processors. Each server 202 and 206 may also include and one or more types of non-transitory, computer readable media, such as a memory that may be used during the execution of various operating programs, including operating programs used in exemplary embodiments of the present invention. The memory may include read-only memory (ROM), random access memory (RAM), and the like.

In some exemplary embodiments, a server cluster is configured spanning across both the source server 202 and the target server 206. The server cluster may be a group of servers 108 (FIG. 1), linked by the communications network 110, that share the computational workload of the clients 112. For example, the server cluster can be configured as a Microsoft Windows Failover Cluster. Any number of servers can participate in the server cluster, and the virtual machine may be configured as a cluster resource.

Both the source storage system 204 and the target storage system 208 may be operatively coupled to their respective servers 202 and 206 via the storage area network 118 (FIG. 1) and managed by a storage system management software 210. The management software 210 may run in one of the servers included in each respective data center, which may be a separate server (not shown) commonly referred to as a management station. The source storage system 204 is presented to the source server 202 as a read-write storage device and the replicated target storage system 208 is presented to the target server 206 as a read-only storage device.

The system also includes a persistent store 212, which may be used during virtual machine migration to maintain storage system status information regarding the configuration of the source storage system 204 and the target storage system 208. The persistent store 212 may be a cluster database maintained by each cluster manager 214 on all servers 108 in the cluster. The persistent store 212 may be stored, for example, in a memory of each server 108 or each associated storage system 114. Data consistency and currency across all servers 108 may be maintained through the persistent store 212. Changes in the data stored to the persistent store 212 of one cluster node may be reflected to the persistent store 212 of all other cluster nodes immediately via a cluster heartbeat network. In this way, all the physical servers 108 included in the server cluster may have access to the same set of persistent store 212 information.

Both the source server 202 and target server 206 may include a hypervisor 215 configured to provide the virtual machine and monitor the execution of the guest operating systems provided by the virtual machine. During the virtual machine migration, the hypervisor 215 may copy memory contents and CPU states of the source server to the target server through the communications network 110.

The migration manager 128 running on the source server 202 and target server 206 controls various aspects of the migration of the virtual machine from the source server 202 residing on the source storage system 204 to be migrated to a target server 206 and an associated target storage system 208. The migration manager 128 may include a notification engine 216, status-gathering module 218, and failover module 220. For purposes of clarity, each server 202 and 206 is shown with only those elements of the migration manager 128 that are active during the migration of the virtual machine 102 (FIG. 1) from the source server 202 to the target server 204. It will be understood however, that the migration manager 128 will generally include all of the features used for migrating a virtual machine to or from the server on which the migration manager resides. Furthermore, those of ordinary skill in the art will appreciate that the functional blocks and devices shown in FIG. 2 may include hardware elements including circuitry, software elements including computer code stored on a non-transitory, machine-readable medium, or a combination of both hardware and software elements.

The notification engine 216 may be configured to receive status change notifications from the cluster manager 214 indicating various states of the virtual machine hosted by the source server 202. For example, a Microsoft Windows Failover Cluster provides notification APIs to track changes in cluster resources. The activation of a virtual machine migration may be indicated by a change in a specified virtual machine state value, referred to herein as a migration state. The notification engine 216 can be configured to periodically poll the status change notifications generated by the cluster manager 214 and parse through the notifications to identify a change in the migration state. If the migration state fetched by the notification engine 216 indicates that the live migration has been initiated, the notification engine 216 calls the status-gathering module 218.

In exemplary embodiments, the source server 202 and the target server 206 are not configured as a cluster and may not include a cluster manager 128. A migration utility (not shown) may be used instead of the cluster manager 128 to initiate the virtual machine migration of the source server 202. The migration utility may send notification to the notification engine 216 when virtual machine migration is initiated. The migration utility may also send other migration state information to the notification engine 216 regarding the transfer of CPU states and memory contents to the target server 206.

The status gathering module 218 performs various storage preparation tasks used to prepare the target server 206 to receive the virtual machine from the source server 202. For example, upon initiation of the virtual machine migration, the status gathering module 218 may obtain the replication link states, data currency or consistency states, disk access privileges, and other information related to both the source storage system 204 and the target storage system 208 on which the virtual machine resides. The storage preparation tasks performed by the status gathering module 218 may be performed in parallel with other virtual machine migration tasks, such as the copying of CPU states and memory contents. In this way, significant time savings may be achieved during the migration process. The status gathering module 218 may store the gathered information to the persistent store 212. As noted above, data stored to the persistent store 212 may be accessible to all the physical servers in the cluster, including the source server 202 and the target server 206. When the CPU states and memory contents have been copied from the source server 202 to the target server 206, the failover module of the target server 206 may be triggered.

The failover module 220 of the target server 206 handles the failover of the virtual machine from the source server 202 to the target server 206. After the migration, the virtual machine will be hosted by the target server 206 and will reside on the target storage system 208. The failover module 220 may change the replication direction of the virtual machine's data storage devices 116 (FIG. 1) at the storage system level, using the information stored in the persistent store 212 by the status gathering module 218. The failover module 220 also changes the access privileges of the source server 202 and the target server 206 to their respective virtual machine related storage devices. Embodiments of the present invention may be better understood with reference to FIG. 3 and accompanying description.

Figure 3:
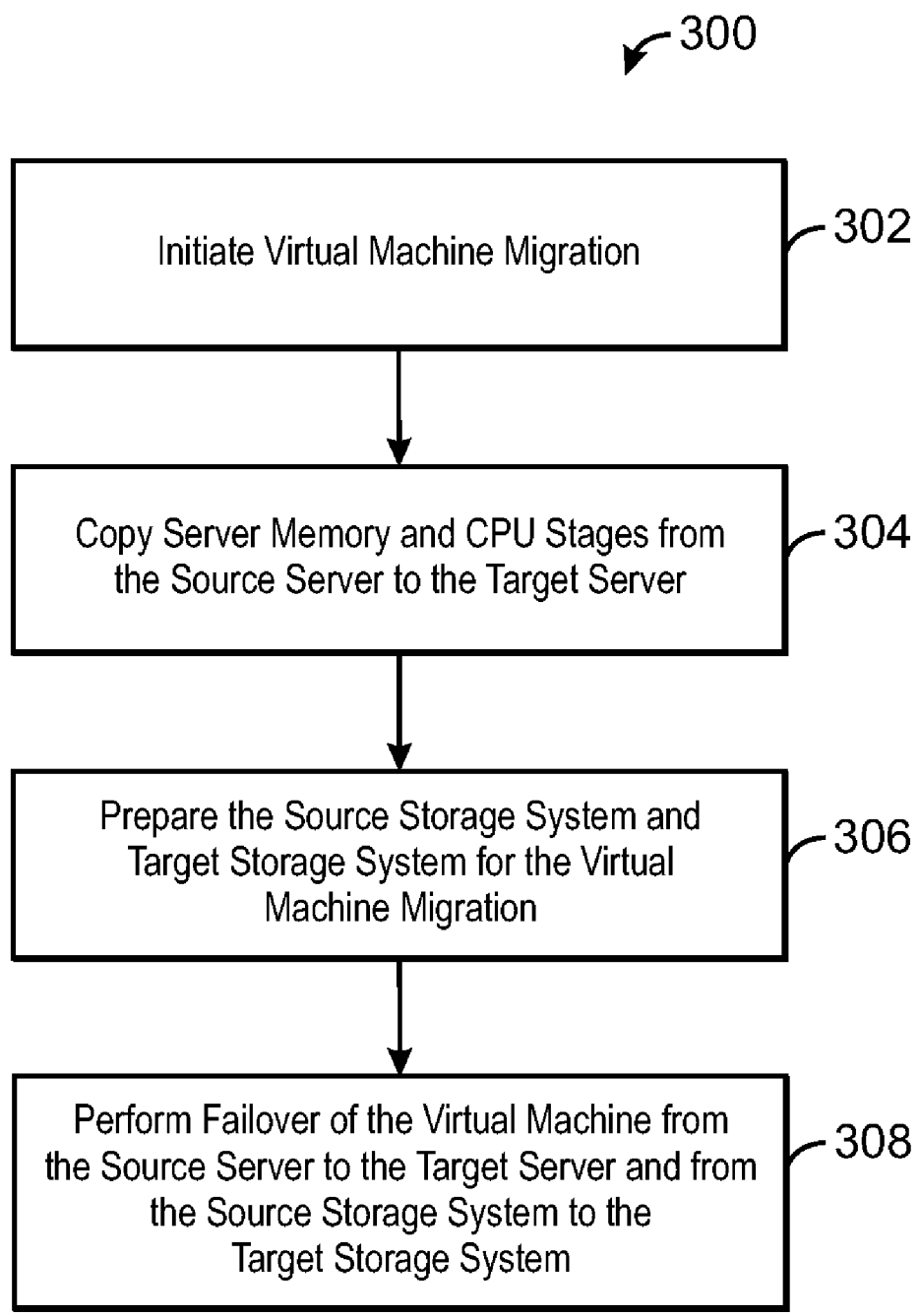
FIG. 3 is a process flow diagram of a method of migrating a virtual machine, in accordance with an exemplary embodiment of the present invention.

FIG. 3 is a process flow diagram of a method of migrating a virtual machine, in accordance with an exemplary embodiment of the present invention. The method may be referred to by the reference number 300, and is described in reference to the exemplary system of FIG. 2. Prior to triggering the virtual machine migration, the virtual machine to be migrated is hosted by the source server 202 and resides on the source storage system 204. The storage devices 116 of the source storage system 204 used by the virtual machine to be migrated may be replicated through the replication links 124. In some embodiments, the replication of the virtual machine data stored to the source storage system 204 is ongoing and continuous regardless of any eventual virtual machine migration. During the replication, the disk on the source storage system 204 is presented to the source server 202 as a read-write storage device and the replicated disk on the target storage system 208 is presented to the target server 206 as a read-only storage device.

The method 300 begins at block 302, wherein the virtual machine migration is initiated. As described above, the virtual machine migration may be initiated by the cluster manager 214, which may send a migration state to the notification engine 216 that indicates the start of the virtual machine migration. The virtual machine migration may be initiated by an administrator or in response to a migration schedule specified by an administrator, for example, a migration schedule used to implement "follow the sun" data center access. In a "follow the sun" model the virtual machine 126 is hosted on a server 108 and storage system 114 closer to the data center 102 where application processing takes place. For example, the virtual machine 126 may be hosted on one data center 102 during normal working hours of a first client 112 and hosted on another data center 102 during normal working hours of a second client 112 that is in a different time zone compared to the first client 112. The virtual machine migration may also be automatically initiated to provide load balancing or to provide access continuity in the event of data center failure. Upon initiation of the virtual machine migration, the process flow may advance to block 304.

At block 304, the memory contents and CPU states of the source server 202 related to the migrated virtual machine are copied to the target sever 206, which enables the notification engine 216 to trigger the status gathering module 218. The memory contents and CPU states may be copied to the target server 206 by the hypervisor 215 through the communications network 110.

At block 306, the status gathering module 218 prepares the source storage system 204 and target storage system 208 for the virtual machine migration. The status gathering module 218 may obtain various status information related to both the source storage system 204 and the target storage system 208 on which the virtual machine resides, for example, replication link states, data currency or consistency states, disk access privileges, and the like. The status gathering module 218 stores the gathered information to the persistent store 212. The status gathering module 218 may also store timestamps to the persistent store 212 describing the time at which the status information was gathered. The timestamps may be used to ensure that the gathered information is current at the time that the virtual machine is switched to the target server 206. As noted above, data stored to the persistent store 212 may be available to all of the servers of the cluster, including the target server 206. Additionally, if the source storage system 204 is using asynchronous replication, the status gathering module 218 may switch the source storage system to synchronous replication. Switching to synchronous replication drains any replication buffers so that the virtual machine related data stored to the target storage system 208 will be current. In exemplary embodiments, the process of the status gathering module 218 gathering the storage system status information and copying the information to the persistent store 212 happens at the same time that the hypervisor 215 is copying the memory and CPU states to the target server 206. In other words, the processes described in relation to blocks 304 and 306 may be executed in parallel. During the processes described in blocks 304 and 306, the virtual machine is still running on the source server 202 and clients are able to access the virtual machine. After the memory and CPU states have been copied to the target server as described in block 304, the process flow may advance to block 308.

At block 308, the virtual machine is swapped from the source server 202 to the target server 206 using the data stored to the persistent store 212. To trigger the swap, or "failover," the hypervisor 215 of the target server 206 may send an indication to the cluster manager 214 of the target server 206, informing the cluster manager 214 of the target server 206 that the memory and CPU states have been successfully received from the source server 202. At this time, the storage system information has also been received from the source storage system 204 through the persistent store 212, and the virtual machine related storage devices 116 (FIG. 1) have been replicated to the storage devices 116 of the target storage system 208. The cluster manager 214 of the target server 206 may then trigger the failover module 220 running on the target server 206.

The failover module 220 running on the target server 206 performs the failover so that the virtual machine swaps from being hosted by the source server 202 to being hosted by the target server 204. The failover module 220 may also change the replication direction of the virtual machine data, such that the virtual machine data stored to the target server 206 may be replicated to the source storage system 204. The failover module 220 may also change the access privileges of the source server 202 to the virtual machine related storage devices 116 in the source storage system 202 from read/write access to read-only access. The failover module 220 may also change the access privileges of the target server 206 to the virtual machine related storage devices 116 in the target storage system 208 from read-only access to read/write access. Additionally, if the timestamps associated with the storage system status information stored in the persistent store 212 indicate that the status information is not current, the status information may be re-gathered to obtain more recent storage system status information. For example, storage system status information may be re-gathered for any status information that is older than approximately five minutes.

After the failover is achieved, the virtual machine continues running now on the target server 206 and resides on the target storage system 208. Additionally, the virtual machine related storage devices of the target storage system 208 may be replicated to the storage devices 116 of the source storage system 204. The failover described in block 308 can be carried out before the TCP/IP timeout window expires so that the clients 112 accessing the virtual machine will not get disconnected. For example, the failover can be carried out within a time window of 15 seconds. In this way, the clients 112 can still continue to access the virtual machine in a location-transparent manner without any interruption in connectivity.

Figure 4:
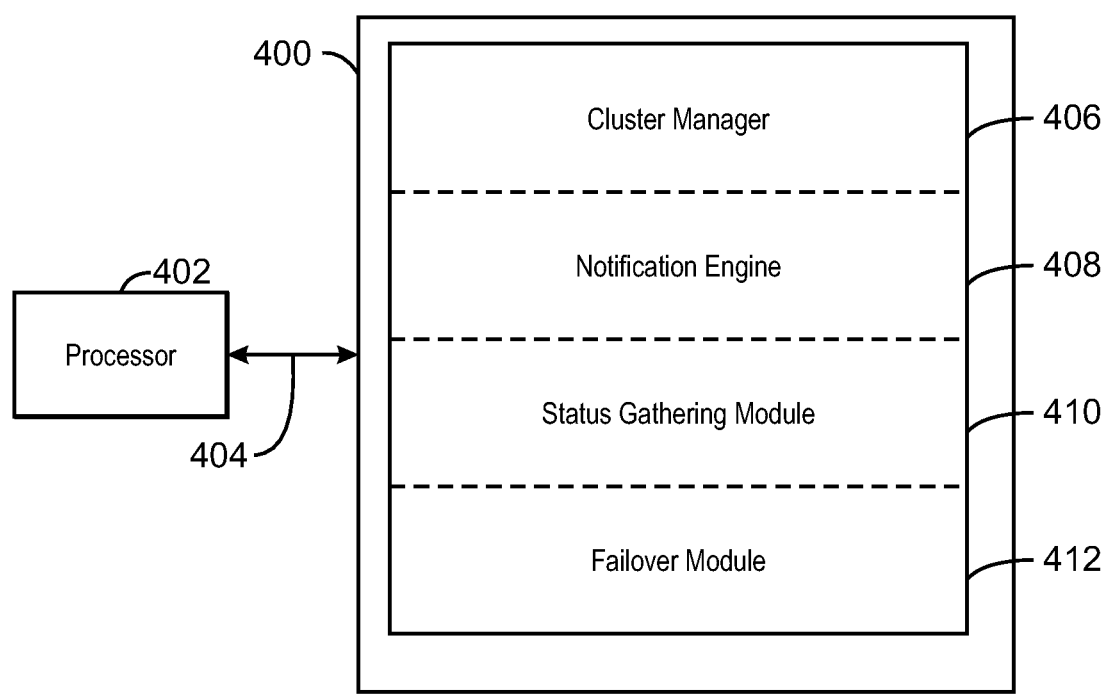
FIG. 4 is a block diagram showing a non-transitory, machine-readable medium that stores code configured to provide a virtual machine migration manager, in accordance with an exemplary embodiment of the present invention.

FIG. 4 is a block diagram showing a non-transitory, machine-readable medium that stores code configured to provide a virtual machine migration manager, in accordance with an exemplary embodiment of the present invention. The non-transitory, machine-readable medium is referred to by the reference number 400. The non-transitory, machine-readable medium 400 can comprise RAM, a hard disk drive, an array of hard disk drives, an optical drive, an array of optical drives, a non-volatile memory, a universal serial bus (USB) drive, a digital versatile disk (DVD), a compact disk (CD), and the like. In exemplary embodiments, the non-transitory, machine-readable medium 400 is executed on one or more servers in a server cluster. The non-transitory, machine-readable medium 400 may be accessed by a processor 402 over a communication path 404.

As shown in FIG. 4, the various exemplary components discussed herein can be stored on the non-transitory, machine-readable medium 400. A first region 406 on the non-transitory, machine-readable medium 400 can include a cluster manager configured to manage a server cluster operating on a server network 100 (FIG. 1). The cluster manager may be configured to initiate the virtual machine migration. A hypervisor may be configured to copy memory and CPU states from a source server to a target server. A region 408 can include a notification engine to receive a migration state from the hypervisor, the migration state indicating initiation of the virtual machine migration from the source server to the target server. A region 410 can include a status gathering module configured to collect status information of the source and target storage systems and devices and store the information to a persistent store accessible to the second server. A region 412 can include a failover module configured to perform a failover of the virtual machine from the source server to the target server and from the source storage system to target storage system.

What is claimed is:

1. A computer-implemented method of migrating a virtual machine, comprising:
    replicating a source storage device corresponding to the virtual machine to a target storage device through replication links;
    receiving a migration state that indicates initiation of a migration of the virtual machine from a source server to a target server;
    collecting storage system status information of the source storage device and storing the storage system status information to a persistent store accessible to the target server;
    sending memory states and central processing unit (CPU) states to the target server through a communications network; and
    performing a failover of the virtual machine from the source server to the target server and from the source storage device to the target storage device.

2. The method of claim 1, comprising periodically polling a cluster manager to receive cluster state change notifications, and parsing the cluster state change notifications to identify the migration state.

3. The method of claim 1, wherein collecting storage system status information for the source storage device and storing the storage system status information to the persistent store occurs in parallel with sending the source server memory and the CPU states to the target server.

4. The method of claim 1, wherein the source server and the source storage device are included in a first data center, and the target server and the target storage device are included in a second data center, and the first data center and the second data center are geographically separated.

5. The method of claim 1, wherein the migration of the virtual machine is completed before a TCP/IP timeout window expires so that a client accessing the virtual machine will not experience a disruption of service from the virtual machine.

6. The method of claim 1, wherein the storage system status information includes replication link states, data currency or consistency states, disk access privileges, or a combination thereof.

7. The method of claim 1, comprising initiating the virtual machine migration according to a specified schedule of virtual machine migrations.

8. The method of claim 1, wherein a client accessing the virtual machine does not experience loss of access to the virtual machine during the migration.

9. A system comprising:
    a first data center comprising a first server and a first data storage device;
    a second data center comprising a second server operatively coupled to the first server through a communications network and a second data storage device operatively coupled to the first data storage device through a storage area network, wherein the first data storage device is replicated to the second data storage device through replication links;

a virtual machine hosted by the first server and residing on the first storage device;

a first memory device that stores instruction modules that are executable by the first server, the instruction modules comprising:

a hypervisor configured to copy memory contents and CPU states of the first server to the second server through the communications network during a virtual machine migration;

a notification engine configured to receive a migration state from a cluster manager, the migration state indicating initiation of the virtual machine migration from the first server to the second server; and a status gathering module configured to collect storage system status information of the first storage device and store the storage system status information to a persistent store accessible to the second server; and a second memory device that stores an instruction module that is executable by the second server, the instruction module comprising a failover module configured perform a failover of the virtual machine from the first server to the second server and from the first data storage device to the second data storage device.

10. The system of claim 9, wherein the notification engine is configured to periodically poll the cluster manager to receive cluster state change notifications and parse the cluster state change notifications to identify the migration state.

11. The system of claim 9, wherein the status gathering module collects the storage system status information and stores the storage system status information to the persistent store at the same time that the cluster manager sends the source server memory and the CPU states to the second server.

12. The system of claim 9, wherein the first data center and the second data center are geographically separated.

13. The system of claim 9, wherein the migration of the virtual machine is completed before a TCP/IP timeout window expires.

14. The system of claim 9, wherein the failover module is configured to reverse a replication direction of the first storage device and the second storage device, such that the first server's access to the first storage device becomes read-only and the second server's access to the second storage device becomes read/write.

15. The system of claim 9, wherein the cluster manager is configured to initiate the virtual machine migration in response to a system failure at the first data center.

16. A non-transitory, computer-readable medium, comprising code configured to direct a processor to:

receive a migration state from a cluster manager, the migration state indicating initiation of a virtual machine migration from a first server to a second server; wherein a first storage device corresponding to the first server has been replicated to a second storage device corresponding to the second server;

copy memory contents and CPU states of the first server to the second server through a communications network in response to the initiation of the virtual machine migration;

collect storage system status information of the first storage device and store the storage system status information to a persistent store accessible to the second server; and perform a failover of the virtual machine from the first server to the second server and from the first storage device to the second storage device.

17. The non-transitory, computer-readable medium of claim 16, comprising code configured to direct the processor to periodically poll the cluster manager to receive cluster state change notifications and parse the cluster state change notifications to identify the migration state.

18. The non-transitory, computer-readable medium of claim 16, wherein the code configured to direct the processor to collect the storage system status information and store the storage system status information to the persistent store executes in parallel with the code configured to send the source server memory and the CPU states to the target server.

19. The non-transitory, computer-readable medium of claim 16, comprising code configured to direct the processor to initiate a replication of the second storage device to the first storage device, such that the first server's access to the first storage device becomes read-only and the second server's access to the second storage device becomes read/write.

20. The non-transitory, computer-readable medium of claim 16, wherein the migration of the virtual machine is completed in a time period of less than approximately 15 seconds.

* * * * *